US008504421B2

(12) United States Patent
Rosenberger

(10) Patent No.: US 8,504,421 B2
(45) Date of Patent: *Aug. 6, 2013

(54) METHOD USING A SOCIAL NETWORK OR WEBSITE TO ENABLE AN INDIVIDUAL TO PROMOTE AN ADVERTISER'S ADVERTISING TO THE INDIVIDUAL'S PERSONAL CONTACTS

(76) Inventor: Ronald John Rosenberger, Newtown, PA (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/021,771

(22) Filed: Feb. 6, 2011

(65) Prior Publication Data
US 2011/0125596 A1    May 26, 2011

Related U.S. Application Data

(63) Continuation-in-part of application No. 12/631,216, filed on Dec. 4, 2009, now Pat. No. 7,885,854, which is a continuation of application No. 10/613,392, filed on Jul. 3, 2003, now abandoned, which is a continuation-in-part of application No. 09/634,612, filed on Aug. 5, 2000, now abandoned.

(60) Provisional application No. 60/394,402, filed on Jul. 8, 2002.

(51) Int. Cl.
*G06Q 30/00* (2012.01)
(52) U.S. Cl.
USPC ....................................................... 705/14.4
(58) Field of Classification Search
USPC ............................................. 705/14.4
See application file for complete search history.

(56) References Cited

U.S. PATENT DOCUMENTS

| 3,647,275 | A | 3/1972 | Ward |
|---|---|---|---|
| 5,569,897 | A | 10/1996 | Masuda |
| 5,945,653 | A | 8/1999 | Walker |
| 5,992,888 | A | 11/1999 | North |
| 6,615,189 | B1 | 9/2003 | Phillips |
| 6,766,302 | B2 | 7/2004 | Bach |
| 7,155,199 | B2 | 12/2006 | Zalewski |
| 7,163,145 | B2 | 1/2007 | Cohagan |
| 7,266,839 | B2 | 9/2007 | Bowers |
| 7,287,011 | B1 | 10/2007 | Wood |
| 2002/0046089 | A1 | 4/2002 | Zorn |
| 2003/0033246 | A1 | 2/2003 | Slater |
| 2003/0040963 | A1 | 2/2003 | Kogler |
| 2003/0126015 | A1 | 7/2003 | Chan |
| 2003/0204470 | A1 | 10/2003 | Manchester |
| 2005/0021400 | A1 | 1/2005 | Postrel |

*Primary Examiner* — James W Myhre

(57) ABSTRACT

A method using a social network or website to enable an individual to promote an advertiser and related advertising to the individual's personal contacts, such as friends, relatives, and acquaintances. In one embodiment, contacts are prompted that clicking on an advertiser's advertising appearing on the individual's social network page website will enable the individual's contacts to experience a message from the individual, wherein the individual is provide with message capability as compensation or as an incentive. The method also enables procurement and usage of an individual's endorsement to increase the advertising's impact on the individual's contacts. A key principle is than an individual's contacts will likely be more responsive to advertising that appears along with the individual's message, especially when compared to ordinary advertising sans such a message, whereby a contact's interest in the individual's message may result in a transference of interest to the advertiser.

18 Claims, No Drawings

METHOD USING A SOCIAL NETWORK OR WEBSITE TO ENABLE AN INDIVIDUAL TO PROMOTE AN ADVERTISER'S ADVERTISING TO THE INDIVIDUAL'S PERSONAL CONTACTS

CROSS REFERENCE TO RELATED APPLICATIONS

This application is a continuation-in-part of non-provisional application Ser. No. 12/631,216, filed Dec. 4, 2009 and issued Feb. 8, 2011, as U.S. Pat. No. 7,885,854, which Ser. No. 12/631,216 application is a continuation of non-provisional application Ser. No. 10/613,392, filed Jul. 3, 2003, now abandoned, which Ser. No. 10/613,392 application is a continuation in part of non-provisional application Ser. No. 09/634,612, filed Aug. 5, 2000, now abandoned, and which Ser. No. 10/613,392 application claims priority to provisional application No. 60/394,402, filed Jul. 8, 2002. Each of the above applications and patent are entirely incorporated herein by reference.

BACKGROUND

At countless outlets around the world, there are small credit card displays that contain applications for credit card offerings from American Express. As it turns out, these applications are coded with information reflecting the promoter that provided the location for the credit card display. In many instances, a promoter is the owner or management of a small business that provides a small space where members of the general public can take a card application from the credit card application display. Should an application results in an opened account, a fee is paid to the promoter, whose identity is determined by the code that appears on the application. For example, if an individual picks up an American Express credit card application from a pamphlet display at Joe's Pizza Parlor, applies for the credit card, and the credit card account is subsequently opened and the credit card is issued, then American Express will financially compensate Joe's Pizza Parlor for its efforts as a promoter based on the coded application.

Industries, business entities, and non-profit entities spend billions of dollars a year promoting goods and services. In the year 2000, drug companies spent $15.7 billion on promotional expenditures. In the same year, the drug company Merck & Co. spent $160.8 million to promote a single drug ("Vioxx"). Drug companies especially focus on direct-to-consumer advertising, with the desired end result being the patient asking the physician about certain drugs by name. Every indication shows that the strategy works well. While it is conceivable that a company, individual or other entity could pay to have advertising placed on communications (such as a billing statement for a credit card) there are other means that are worth consideration.

SUMMARY

Unlike the above example where Joe's Pizza Parlor receives money from the offering entity for every end user that signs up for an account or membership (e.g., a credit card) using a coded application from its application display, the method disclosed here teaches compensating a promoter by giving the promoter a mention, or other forms of advertisement in the communications that the offering entity sends to the end user. The mention/advertisements may be used in place of, or in addition to, financial remuneration from the offering entity to the promoter.

Methods and/or systems of the present invention that are to be presented here have great flexibility, and may be applied in myriad ways. Methods and/or systems of the present invention comprising applications and accounts may be used to promote any account (e.g., social media, search engine, or financial service or card). Furthermore, the method may be used to promote anything, such as any service (such as bank account services, checking account services, Internet services, heating and air conditioning service contracts, drug discount program, etc.), or such as any products (such as weekly bottled water deliveries, magazine subscriptions, newspaper subscriptions, fruit of the month club, etc.), that uses, or that can be adapted to use, an application process. Also, the method comprising applications and accounts may be adapted for use in promoting advertisements to end-users, where an "application" that is filled out and returned results in the end user receiving advertising. Advertising entities may be a primary advertiser entity (advertising its own products or services), or third-party advertiser entity (an advertiser for hire, whose service comprises performing advertising functions for one or more client entities). An application and account may also be for an end user to receive reminders, tips, or suggestions for health related, non-health related, or health and non health related matters, either in concert with the above-mentioned financial cards, services, products, or advertisements; or in absence of financial cards, services, products, or advertisements. Each party can be a separate promoter and a separate offering entity, each providing advertisements in exchange for a sign up or mention, but where for each transaction of advertisement for sign up, the promoter and the offering entity are different. Finally, an application and account may be for an end user to receive cards, services, products, or advertisements in absence of reminders, tips, or suggestions.

The following discussion focuses on how the method works with regards to encouraging others to promote a given entity's credit card that also features health reminders, tips, or suggestions.

Drug companies have legions of young, attractive representatives that go from one doctor's office to another, hoping to have a minute with a given physician in order to promote a particular drug company's offerings. Drug reps will offer inducements, such as providing lunch for the office staff, or tickets to events, as a means of gaining the physician's favor in prescribing the drug company's products. A typical drug rep calls upon many physicians in a single year. These reps could provide a great conduit of credit card promotion if given the proper incentive. Here is an instance using the Pink Card, with its features of health reminders, tips, and suggestions, as an example. A drug rep calls upon a physician with a new program aimed at the mutual benefit of the drug company, physician, and the patient. The drug rep carries in a small credit card display filled with Pink Card applications. The rep explains to the physician that the Pink Card not only offers credit card services, but also offers mammogram reminders, OB/GYN reminders, and monthly breast self-exam reminders (although the health reminder disclosure extends to any aspect of health, regardless of gender) in conjunction with the card's transaction/activity statement (just to name one embodiment). The drug rep also explains that the applications are coded with the drug company's identifier, and a special identifier for that particular physician. Each patient that procures a credit card by using an application provided by the drug company and the particular physician will not only receive health reminders via the card issuer, but an additional mention as well in conjunction with communications comprising the health reminders:

"THESE HEALTH REMINDERS ARE PROVIDED COURTESY OF DR. IVAN SCHWARTZ, (000) 555-1111; AND DRUGCO, MAKERS OF ABC, AND DEF, WHICH ARE APPROVED BY THE FDA AS BEING SAFE AND EFFECTIVE."

It is also possible to use the mechanism in the absence of reminders, tips, and suggestions. Such a mention would be as follows: "THESE CARD SERVICES ARE PROVIDED IN ASSOCIATION WITH DR. IVAN SCHWARTZ, (555) 000-1111; AND DRUGCO, MAKERS OF ABC, AND DEF, WHICH ARE APPROVED BY THE FDA AS BEING SAFE AND EFFECTIVE."

Keep in mind that the above mentions have the capability to appear every time a transaction statement and/or reminder is issued. Terms may be negotiated as to whether the mentions and/or advertisements will appear on just a limited number of statements, or will continue for the entire time that the card is in force. Other capabilities include changing any or all aspects of the information of the mentions and/or advertisements, such as the drug company's new product launches or phone number updates. Should a physician choose to sell his practice, a large quantity of patients that hold a card where the physician's name is inscribed and reinforced continually could be deemed a very valuable asset, especially since the new physician's name could be readily substituted for the old physician's name, which will help make the new physician's name a "household word", possibly reducing patient attrition for the new owner of the medical practice. A secondary market can even emerge with brokers buying and selling patient lists among physicians, or even among drug companies. Of course, text and content of the mentions and/or advertisements may appear per the whims of the parties that are involved, with the drug rep possibly offering the physician a choice of configurations.

Let's see who wins in this scenario:

The cardholder wins with health reminders that may enable the cardholder to live a longer and healthier life.

The physician wins by appearing as being especially caring for the welfare of his patients, not to mention the fact that the cardholder list could become a valuable promotion tool and business asset that doesn't cost the physician anything.

The drug company wins with direct-to-consumer advertising that is potentially perpetual for the life of the card; also, in the eyes of the patient, the physician's name and drug company's name are "forever" bound in ink (or computer code), which will hopefully lend credibility to the drug company; also, the drug company avails itself to the possibility that the physician could view his relationship with the drug company as an informal "partnership" or association (again, due to being "bound in ink") that ultimately results in the physician prescribing the drug company's products preferentially. Costs to the drug company are negligible. Potentially, the only costs that will be borne is the time that is required in promoting the cards, whereas the card entity will bear most if not all of the expenses of delivering the reminders/mentions and/or advertisements.

The credit card entity wins by getting new cardholders; also, by being associated in print with a physician that the cardholder (hopefully) trusts and respects, it is possible that the cardholder could view the physician's association as a de facto endorsement of a particular card issuer, which lends to the card issuer's image. Also, by offering health related reminders, tips, and suggestions, it is possible that a physician could recommend the card entity's products as a valuable means of providing or reinforcing health awareness for the benefit of the patient.

It is quite possible that the synergy that this invention encourages between the patient, doctor, drug company, and credit card issuer could represent a new dynamic that promotes a whole new level of relationships and brand building among theses four factions. Over time, the end result could prove much more effective and beneficial than merely paying a one time fee to the promoter whose code appears on a "winning" card application.

The example above illustrates the application as being a credit card application. A drug company could wish to promote its own co-branded credit card, or could choose not to have anything to do with financial cards, and simply offer applications for health reminders, tips, or suggestions that would emanate from the drug company (or a third party associated with the drug company that performs some or all of the method steps of supplying the health reminders, tips, or suggestions). The drug company could use the circulation of said health reminders as means of delivering advertisements (as taught by a related CIP application) about new drugs to the end user. Also, the drug company can provide (as mentioned earlier) a drug discount program that uses a sign-up application process that may or may not make use of health reminders, tips, or suggestions. The common thread is that regardless of what the application pertains to, the drug company receives mention as either a promoter, or perhaps as the originating offering entity, and the physician receives mention due to being the promoter that makes the applications available to his patients.

The parent application makes reference to the Green Card, which features environmental/gardening/planting reminders. An example of mentions and/or advertisements is as follows: "THESE GARDENING AND PLANTING REMINDERS ARE PROVIDED COURTESY OF BOB'S GARDEN SUPPLY, (000) 555-8888; AND GREENTURF INC, MAKERS OF WEED-NO-MORE AND GROW-GRASS-GROW."

Such a mention could be very valuable to a small company such as Bob's Garden Supply, which really needs all the customer loyalty aids that it can get, especially since it is trying to compete with giant entities such as Home Depot and Lowe's. The fact that the repeated impressions on numerous customer card transaction statements possibly won't cost Bob's Garden Supply anything should offer proper incentive to offer the card applications. Also, Greenturf gets direct-to-customer promotion for its products, and also gets the attention of Bob's Garden Supply, being that the Greenturf representative makes all of this possible. This could result in Greenturf having an advantage over the competition when it comes time for Bob's Garden Supply to order inventory stock. Having customers ask for Greenturf products by name, thanks to repeated direct-to-customer mentions/advertising, is certainly a helpful brand builder for Greenturf. Finally, the card entity should at least get Bob of Bob's Garden Supply, as well as some of Bob's employees, family and friends as new cardholders, because it is likely that Bob will enjoy seeing his company's name imprinted on a card transaction statement. Greenturf could promote its own co-branded card, or simply choose to avoid financial cards entirely and offer instead signup applications for home and garden related reminders, tips, or suggestions, or signup applications for advertising comprising coupons, special offers, catalogs, brochures and other promotional literature, or signup applications for special programs, or information dissemination (such as newsletters comprising recipes for those great vegetables that Greenturf helped grow), with or without home and garden related reminders, tips, or suggestions. Regardless, the applications would be coded to ensure that Bob's Garden Supply receives acknowledgement. There is a distinction that needs to be made at this time. A business such as Bob's Garden Supply is not like a franchisee whose parent company sends out advertisement flyers with the franchisee's name and contact information attached based on a mailing list. A business such as Bob's Garden Supply may have several (if not numerous) vendors, each competing with each other for Bob's business. This method, using coded applications for anything that uses, or can be adapted to use, an application process, is intended to act as a tool that enables the vendor that supplies this method for the benefit of Bob's Garden Supply an advantage over other vendors.

Also disclosed is an optional mechanism in the method where the promoter obtains a listing of end users ("end users" being defined as a term for the individuals that have completed and submitted applications) that are the result of the promoter's efforts. This enables the promoter to see the names of all the end users he has enlisted. While a card entity may make this list available to the promoter for whatever purpose, the method may be enhanced with a file maintenance feature that enables the promoter to provide a message to the end user that will appear in communications that will ultimately be received by the end user.

Also, while the method enables a promoter to provide information/messages/text, links, and the like in the claimed file and claimed advertisements pertaining to a promoter, the method also allows for where said file and said advertisements may also, or instead, provide for a picture, photograph, image, video, film and the like, as well as audio clips or sound clips and the like, that will appear in the communications between the offering entity and end users.

The present invention provides one or more methods, systems, software, SAPs, cloud, and other IT implementations, where a promoter receives advertisements, mentions, communications, notices, promotions, and the like, as a means of full or partial compensation or consideration from an individual, company, or other entity, such as, but not limited to, a product or service offering entity for new or other account, membership, email list, or other inclusion, sign up(s) of end users generated by the promoter, comprising 1, 2, 3, 4, 5 or more of the following steps:

providing a file or other data entry comprising the advertisements, mentions, communications, notices, promotions, and the like for the promoter;

storing the file or other data entry on a computer system, server or other readable medium;

providing a promoter code or other tracking identifier that cross references the promoter code or other tracking entity to the file information on a computer readable medium;

distributing or providing account applications or sign ups, electronically or by paper comprising the promoter code;

establishing the accounts for the end users based on the processing of the account applications comprising the promoter code for redeemed application; and, issuing communications to the end users of the accounts, where the communications comprise the file information comprising the advertisements, as referenced by the promoter coding information, wherein the promoter is different than the offering entity, and wherein the file information is added, modified, or deleted.

Such methods, systems or other embodiments can include wherein the method is used to promote a product, service, brand, relationship, or information. Such methods, systems or other embodiments can include wherein the new account sign-up is for the end user to receive a product or a service. Such methods, systems or other embodiments can include wherein said new account sign-up is for said end user to receive advertizing. Such methods, systems or other embodiments can include wherein the advertisements comprise at least one selected from coupons, special offers, catalogs, brochures, promotional literature, special programs, newsletters, information dissemination, and the like provided by the promoter.

Such methods, systems or other embodiments can include wherein the advertisements comprise at least one selected from announcements, notices, or reminders provided by the promoter. Such methods, systems or other embodiments can include wherein the advertisements comprise information, messages, or text provided by the promoter. Such methods, systems or other embodiments can include wherein the advertisements comprise text and content provided by the offering entity on behalf of the promoter. Such methods, systems or other embodiments can include wherein the communications comprise at least one selected from billing statements, advertising, coupons, special offers, catalogs, brochures, promotional literature, special programs, newsletters, information dissemination, announcements, notices, or reminders from the offering entity.

Such methods, systems or other embodiments can include wherein access to the promoter or to the offering entity comprises at least one selected from the Internet, a communicative conduit, a communicative device, a website, a network, an outlet, a call center, a mailing, or a physical location. Such methods, systems or other embodiments can include wherein the promoter can provide an individualized message or advertisement to a particular end user selected from the end users.

Such methods, systems or other embodiments can include wherein the advertisements comprise at least one selected from a picture, photograph, or graphic image provided by the promoter. Such methods, systems or other embodiments can include wherein the advertisements comprise at least one selected from a video clip or movie clip provided by the promoter. Such methods, systems or other embodiments can include wherein the advertisements comprise at least one selected from an audio clip or sound clip provided by the promoter. Such methods, systems or other embodiments can include wherein access to the promoter or the offering entity comprises at least one selected from an online advertisement, a search engine, a social network, or a provider.

Such methods, systems or other embodiments can include wherein the new account sign-up results when the end user clicks on, triggers, or deploys an online advertisement. Such methods, systems or other embodiments can include wherein the advertisements from the promoter are experienced when an online advertisement is clicked on, triggered, or deployed by the end users or potential end users. Such methods, systems or other embodiments can include wherein the online advertisement comprises a notification that the end users, or the potential end users, will experience the advertisements from the promoter when the online advertisement is clicked on, triggered, or deployed by the end users, or the potential end users.

Such methods, systems or other embodiments can include wherein the advertisements from the promoter are experienced upfront as part of an online advertisement without requiring the online advertisement to be clicked on, triggered, or deployed by the end users or potential end users.

Furthermore, the present invention is useful to communicative conduits, online advertisements, websites, networks, outlets, and the like including search engines, social networks, providers such as content providers, blogging and micro-blogging providers, email providers, or any such embodiment that enables advertising for an offering entity of a product, service, brand, relationship, or information.

DESCRIPTION

Methods and/or systems of the present invention entail where a promoter receives mentions and/or advertisements as a means of full or partial compensation from an offering entity for each new sign-up of end users generated by the promoter. The mentions and/or advertisements appear in communications that are provided by the offering entity either directly or indirectly (through a third party) to the end users. The mentions and/or advertisements of a given promoter appear in communications of the end users that were introduced or established through the efforts of the given promoter. It should be mentioned that any or all steps of the method may be performed either directly by the offering entity, or indirectly by a third party or third parties, where the third party or third parties are associated with, retained by, referred by, or linked via Internet or intranet with the offering entity, or by any combination or permutation of the entity and third party or parties. For example, a third party could perform all computer-related functions of the method, while other functions (such as distribution of applications or the issuing of communications) could be performed by the offering entity.

Once promoters are solicited, the first step is establishing a file comprising information comprising the mentions and/or advertisements of the promoter. The content of this file may comprise any information that is desired by the promoter. The offering entity may allow the promoter full capability with regards to editing the file without assistance from the offering entity, may allow some capability, or may restrict access entirely, where editing must be done by the offering entity (for quality control purposes). Editing comprises the ability to add, modify, revise, or delete the content of the file. For example, the promoter may have an address change that he wants end users to know about, or a promoter whose business is pharmaceuticals may wish to make end users aware of a new drug. The offering entity can establish any parameters, or any limitations on any aspect of the file comprising the mentions and/or advertisements, along with maintaining full editing capability of the file. Access to the file may comprise any communicative means or embodiment that enables the file to be accessed. Examples include providing full promoter access via the Internet to allow the promoter to perform file maintenance functions; or, allowing the promoter to phone a call center where the representative makes, regulates, and approves changes. The offering entity can allow the promoter to keep and use the file without any fee, or may levy fees to the promoter for any aspect of maintaining, accessing, or modifying the file. Any scenario may occur, such as charging fees to nuisance promoters that use up excessive entity resources, while allowing light users to go about their business free of charge.

From here, the file information can be stored on a computer readable medium.

Next, is the establishment of a code that cross-references the code to the file information, resulting in coding information. This coding information is stored on a computer readable medium. It must be stressed that in disclosing this method, various steps may be eliminated, enhanced, or even added, where such additions are is within the spirit and scope of the method. For example, the file information may already comprise a code, thus rendering the method step comprising additional cross-referencing of the code to the file information unnecessary.

Applications may then be distributed or be otherwise made available comprising a promoter code or a plurality of promoter codes. The applications may comprise any communicative embodiment or format, from a printed application on a table or counter display to an application accessed on a website. The application process may even be performed over the phone by calling a call center. While the promoter code may comprise any form, format, or method, the embodiment of the promoter code should be somewhat relevant to the embodiment of the application (although, being that anything is possible, exceptions could apply). For example, a printed application would have the promoter code in the form of a printed alphanumeric or bar code that is ultimately read or scanned, and a website application could have a promoter code in the form of embedded coding information, while a promoter code in the case of using a call center could be as simple as providing the offering entity that is taking the application information with the name of the promoter (such as the physician's name), which may or may not need to be, either manually or automatically, translated into another, more computer-friendly promoter code. Applications may comprise a singular promoter code that corresponds to a single promoter, or a singular promoter code that corresponds to a plurality of promoters, where a single promoter code identifies, say, both the drug company and the physician. Applications may also comprise a plurality of promoter codes, where each of the plurality of promoter codes corresponds to either a singular promoter, or a plurality of promoters.

Next is where the end-user completed applications comprising the promoter codes are redeemed and processed. Accounts are established based on the processing of the applications that comprise the promoter code. As mentioned earlier in the disclosure, accounts may comprise any product or service that makes use of, or can be adapted to use, an application process.

Now comes the issuing of communications to the end users that may basically be described as accountholders, although some, especially those that sign up for advertisements or for reminders, tips, or suggestions, could consider the term a bit excessive. The range of possible communications is as varied as the account matters that they represent, and is further compounded by variations and permutations of embodiments and delivery modes.

Communications may comprise anything that is relevant or non-relevant to the account. For example, for a credit card account, a transaction portion would be relevant to the account, while an attached discount card for a theme park would have no particular relevance to credit card account matters. With regards to communications regarding advertisements, a coupon for a free oil change would be relevant to the "account", while an additional message that says, "Have a nice day" wouldn't be deemed especially relevant, but polite nonetheless. Communications may comprise any communicative means or embodiment. For example, a bill for a bottled water service may be mailed or faxed, while an advertising coupon may be sent as an e-mail attachment that is subsequently opened, printed out, and used. Likewise, reminders, tips, or suggestions may comprise any communicative means or embodiment. The communications and reminders, tips, or suggestions may be conjoined, not conjoined but sent together, or sent separately from each other, where the communications and reminders, tips, or suggestions may comprise identical, similar, or different communicative means or embodiments. An example is where an advertising coupon is mailed, while the associated health reminders, tips, or suggestions are e-mailed. Nonetheless, in deference to the promoter or promoters, the communications and/or reminders, tips, or suggestions would comprise at least one mentions/advertisement for the benefit of the promoter or promoters.

Mentions and/or advertisements may continue to appear in communications and/or reminders, tips, or suggestions for either the entire time that end user account is kept in force by the end user or the offering entity, or for only a limited time determined by any of the involved parties, or by any other factor. The potential variants are limitless. For example, the offering entity may choose to allow a given promoter's mentions and/or advertisements for the life of the end users account (preferably for no charge to the promoter), or for a determined period. Another example is where the determined period comprises the offering entity allowing the promoter's mentions and/or advertisements appear at no cost to the promoter for, say, two years, and then allowing the mentions and/or advertisements to continue for a fee.

Optional mechanisms mentioned earlier comprise the following.

The first is where the listings of accounts that are generated or established through the efforts of a promoter are made available to the promoter, where access to the listings may be made using any communicative means or embodiment that enables the listings to be accessed. An example is where a physician can view a list of end users that he has signed up after logging onto a website, and after entering his personal code and/or password. Another example is where the physician phones a call center, provides proper identification, and then has the list sent to him via fax.

The second is an extension of the first where the listings of end users/accounts that are generated or established through the efforts of a promoter allows for a file maintenance function where the promoter may add, modify, revise, or delete information/messages/text that will be communicated to the end user. While this may be considered as, and may be used as, a means of sending a broadcast to all of the end users/accounts that the promoter has generated, the real value here is that the promoter has the ability to send an individualized message to a given end user. For example, a physician can notify a particular patient that it is time for physical examination by using any communicative means or embodiment. The physician logs onto the originating offering entity's website, accesses his end users that he has generated through his promotion efforts, scrolls down to a particular end user, enters a message, and that message is ultimately communicated by the offering entity to the end user. Likewise, the physician can phone a call center, and have a representative input the physician's desired message that will be communicated by the offering entity to the end user. Management of information/messages/text may employ automation for any desired parameter or function, such as where the information/messages/text cycles at a predetermined time, or for a predetermined duration. Information/messages/text may be used as announcements, notices, or reminders from the promoter to the end user, and are unlike health reminders, tips, or suggestions due to the fact that health reminders, tips, or suggestions are at the behest of the offering entity rather than the promoter, even though information/messages/text emanates from the offering entity as well. Information/messages/text may be relayed to the end user utilizing any communicative means or embodiment.

Here is an opportunity for a pharmaceutical company to really curry a physician's favor. With all of the expenses that physicians face today, the costs of printing and mailing appointment reminders is cause enough for physicians not to do them. A physician may have one of his office staff set up a file of all his patients with the offering entity (in this case, the pharmaceutical company). This list of end users would additionally comprise contact information such as mailing or e-mail addresses, which would bypass the individual end user application/account process method steps in the disclosed method. From here, the physician uses the information/messages/text function to have the pharmaceutical company sends out the appointment reminders to the end users (AKA patients), thus saving the physician time and money. While this is going on, there is nothing to stop the pharmaceutical company from using an advertisement for its fabulous new drug as a carrier medium for the appointment reminders, or adding the end users to mailing lists for other purposes (unless the physician and/or end users find it distasteful). In this sense, and in terms of the method disclosed, each of the end users/patients comprises an individual "account", while the physician that provides the listing of end user/patients and the information/messages/text is the promoter that makes the end users/patients known to the pharmaceutical company (AKA the offering entity). As a safeguard, the offering entity can confirm to the promoter that the communications have been sent, and the means of informing the promoter may comprise any communicative means or embodiment. In reference to the above example, this use of the method could really intertwine a pharmaceutical company with a physician, which would undoubtedly prove advantageous to the pharmaceutical company.

As a note, the information/messages/text may appear as follows: in conjunction with, or in absence of communications; in conjunction with, or in absence of reminders, tips, and suggestions; and/or in conjunction with, or in absence of, mentions and/or advertisements, in any combination or permutation.

As mentioned earlier, the method comprising applications and accounts may be adapted for use in promoting advertisements to end users, where an "application" that is filled out and returned or redeemed results in the end user receiving advertising. In terms of filling out and redeeming an "application" for receiving advertising, such an application process can be achieved in any way, and can be as simple and instantaneous as when an end user "clicks on" an online advertisement, where when an end user clicks on, triggers, or deploys the advertisement, for purposes of this disclosure, the advertisement "click-on", (or trigger or deployment) can "act" as a new account sign-up, where the offering entity is the subject of the advertising (i.e. the offering entity's product, service, brand, relationship, or information is what is being advertised), and the end user that clicks on the online advertisement is the end-user account "sign-up", where the end user becomes the ultimate recipient of the advertising that is viewed and/or heard online, which also includes the promoter's advertising. To clarify, the present invention equates the act of clicking-on an online advertisement as a de facto account sign-up, where in reality, clicking-on an online advertisement, which already and ordinarily occurs millions of times a day when end users clicks-on online ads, is simply a requesting to see additional information or content. Online advertising, as known to millions, if not billions, of people, typically links an end user with at least one of an offering entity's websites, where the offering entity provides advertisements, sales pitches, coupons, special offers, catalogs, brochures, promotional literature, special programs, newsletters, information dissemination, announcements, notices, reminders, and the like. In this context, the present invention adds the disclosed promoter's message/advertisement to this list. While it is logical that the "de facto account sign-up" comprised of a single click-on is for a single visit to a given advertiser's website, such nonetheless gives the offering entity an opportunity to garner at least an introduction to a potential end user, where a deepening of the relationship can occur after the initial click-on.

For the purpose of this disclosure, any individual person, groups of persons, individual organization, or groups of organizations, in any combination, can function as a promoter, or as a plurality of promoters, whereby an organization can be a business, company, association, group, and the like. Furthermore, a promoter organization can be a small organization such as a small business, a medium-sized organization such as a medium-sized business, or a large organization such as a large business. The present invention defines a small organization as including one person up to but not including a hundred people, a medium-sized organization as including one hundred people up to but not including five hundred people, and a large organization as including five hundred people and above. While the present invention is especially useful where promoters are individuals or small organizations/businesses that promote to potential end users that are "warm" contacts (i.e. family, friends, acquaintances, customers, and the like), the present invention also lends itself to promoters that are medium-sized and large organizations as well.

An example of an individual person as a promoter is a fifteen-year-old girl named "Tiffany", whose outlet is her page on a social network called "Bongo" which is accessed by friends, acquaintances, and the like. On Tiffany's Bongo page appears the varied advertising that the "offering entities", aka advertisers, want her and her friends to see. Such provides a chance for one or more advertisers to attract Tiffany as a promoter by offering her an opportunity to provide her own message/advertisement that will be included in an advertiser's advertisement seen by the end users via Tiffany's Bongo page (which would likely include Tiffany herself). As such, a file comprising Tiffany's own message (or "advertisement") is cross-referenced with Tiffany's promoter code that an advertiser, such as a cosmetics company called "Blurr", has associated with the click-on cosmetics advertisement for Blurr that appears on Tiffany's Bongo page. As a result, if one or more of Tiffany's friends clicks the advertisement for Blurr on Tiffany's Bongo page, a message (or "advertisement") from Tiffany appears in the resultant ad that appears, or a message from Tiffany can appear in any such communications that Blurr cosmetics company sends to the Tiffany's friends. In this scenario, Tiffany is the promoter, Blurr is the offering entity, and Tiffany's friends are the end users. The online advertisement from Blurr that appears on Tiffany's Bongo page can even include within the ad itself a notification to "Click on and see a message from Tiffany!" or something else to that effect that notifies Tiffany's friends that they will experience a message from Tiffany if they click on, trigger, or otherwise deploy the advertisement from the cosmetics company. In this scenario, each party is a separate promoter and a separate offering entity, each providing advertisements in exchange for a sign up or mention, but where for each transaction of advertisement for sign up, the promoter and the offering entity are different.

An alternative embodiment could be where the message/advertisement from Tiffany is simply experienced upfront (or in "plain view" in the case of advertisements that are more visual than aural) without actually requiring that the online advertisement be clicked on, triggered, or deployed by the end user (or potential end users, whichever the case). In addition to typical online advertising, the present method lends itself to "pop-up" or "pop-under" advertising as well.

While Tiffany's message/advertisement ostensibly can comprise information/messages/text about anything she desires (for example, reminding her friends about her upcoming "Sweet 16" party), the mechanisms Tiffany interacts with to produce the message/advertisement might, in a different embodiment, also or instead comprise where cosmetics company Blurr prompts Tiffany for any kind of permission, any kind of information, or any kind of input, such as permission for Blurr to have Tiffany's endorsement, or prompting recommendations for Tiffany's preferred lipstick, eye shadow, etc., or for the brand in general, and so on, where such are used for the communications that the cosmetics company sends to Tiffany's friends (and likely to Tiffany as well, being that Tiffany would likely enjoy seeing her own message/advertisements she has produced for the communications). In these instances, Tiffany acts as a very effective promoter, because Tiffany's friends will want to see what Tiffany has to say, so her friends will click-on the Blurr cosmetics company's advertising out of curiosity and interest surrounding Tiffany, which could lead to a transference of curiosity and interest to Blurr. Also, Tiffany is very likely to take numerous opportunities to encourage her friends towards Blurr's company advertising on her Bongo page, if for no other reason than for Tiffany's friends to see her message/advertisements. Such offers a promising situation for an advertiser, where much advertising is typically ignored.

In the above embodiment featuring "Click on and see a message from Tiffany!" that comprises a Blurr cosmetics advertisement, the Blurr advertisement appears on Tiffany's own Bongo social network page. A variation of this is where Tiffany, as a promoter, takes on a more active role in determining those that see the advertisement that includes her message/advertisements. In the case of a social network page, Tiffany could list her friend's social network page identifier(s) (whichever identifiers or address are necessary), where the identifier(s) are used to make the Blurr advertisement comprising Tiffany's mention/advertisements appear on each of said friend's social network pages. In the case of email, Tiffany could list any of her friend's email addresses, or other email identifier, where the addresses or identifier(s) are used to make the Blurr advertisement comprising Tiffany's mention/advertisements appear in said friend's email inbox, or even make the ad itself appear in the traditional ad spaces on the email page. Alternatively, the social network provider, email provider, etc., could comprise a function that allows Tiffany's friends to receive the advertisement without Tiffany having to list each individual contact, such as a "Send to All Contacts" or "Send to All Friends", or subsets thereof. The above is quite different than, say, simply emailing a link for an advertisement to a friend, as such does not comprise the disclosed infrastructure of providing a promoter with a file for the promoter's messages/advertisements, use of a promoter code that is crossed referenced to the file, etc., nor do typical advertisements that one might email to friends have the promoter's file/content as part of the actual advertisement. Also, in the above non-limiting embodiment, the promoter gets to actively choose which individuals or entities will receive the offering entity's advertisements, which may result in advertisements that are particularly well targeted.

It is important to note that per earlier in this disclosure, in addition to having a single promoter, it is possible to also have a "plurality" of promoters. In a different embodiment per the above scenario, Bongo (the social network) may also be a promoter for Blurr, the cosmetics company, in addition to Tiffany. Here, Bongo could provide messages/advertisements in the communications that the Blurr cosmetics company sends to Tiffany's friends that click on the advertisements on Tiffany's Bongo page, which are in addition to Tiffany's mentions and/or advertisements. In this scenario, Tiffany is a promoter that is an individual person, Bongo is a promoter that is ostensibly a large company or organization, Blurr is the offering entity, and Tiffany's friends are the end users.

As such, the present invention is useful to communicative conduits, online advertisements, websites, networks, outlets, and the like including search engines, social networks, providers such as content providers, blogging and micro-blogging providers, email providers, or any such embodiment that enables advertising for an offering entity of a product, service, brand, relationship, or information.

For example, an end user named "Tom" clicks on an advertisement/advertisement link found on a search engine called "Zynnk" for an appliance manufacturer called "Chendon", where as a result, communications between the appliance manufacturer and the end user also contain mentions and/or advertisements for Zynnk. Here, Zynnk acts as the promoter that brings end user Tom, and offering entity Chendon, together. In another example, end user Tom clicks on an advertisement/advertisement link found on a social network known as "Tarsk" for a bank called "Suretrust" offering high-rate CDs, resulting where communications between the bank and the end user also contain mentions/advertisements for Tarsk. Here, Tarsk acts as the promoter that brings end user Tom, and offering entity Suretrust, together. Also, in another example, end user Tom clicks on an advertisement/advertisement link found on an email provider named "Warrpd" for auto insurance company "Nonfalt", resulting where communications between the auto insurer and the end user also contain mentions and/or advertisements for Warrpd. Here, Warrpd acts as the promoter that brings end user Tom, and offering entity Nonfalt, together. In these instances, the present method enables promoters Zynnk, Tarsk, and Warrpd to build or reinforce their brands through their mentions and/or advertisements contained in the communications that offering entities Chendon, Suretrust, and Nonfalt, respectively, convey to end user Tom. In contrast to Tiffany, the individual promoter mentioned earlier, promoters Zynnk, Tarsk, and Warrpd would ostensibly be promoters that are large organizations due to the fact that each of these companies would tend to have employee rosters in the thousands.

In considering the above situation "A" where promoter Zynnk, the search engine, promotes offering entity appliance manufacturer Chendon to a given end user, it is entirely possible in a different situation "B" for Chendon to act as a promoter for offering entity Zynnk, where in situation "B", an end user encounters communications/advertisements for Chendon, where said communications/advertisements also include a mention/advertisement for Zynnk. Therefore, in situation "A", Zynnk is the promoter for offering entity Chendon, whereby Zynnk's promotion efforts are intended to help Chendon obtain more end users/sell more appliances, while in situation "B", Chendon's promotion efforts are intended to help reinforce Zynnk's brand/obtain more end users for its search engine. Keeping this in mind, and depending on the situation, a given company can be a promoter that promotes one or more different offering entities, wherein said company can also be an offering entity that is promoted by one or more different promoters. Also, while it was seen earlier where an individual person can be a promoter that promotes a different offering entity, it should be noted that it is also possible for an individual person to be a promoter that promotes for more than one different offering entity.

While the method enables a promoter to submit information/messages/text, links, and the like in the claimed file and claimed advertisements pertaining to a promoter, it is well known for typical advertisements across the range of everyday media to also include pictures, photographs, images, videos, film, audio, and the like. Therefore, the method also allows for where said file and said advertisements may provide for a picture, photograph, image, video, film, audio, and the like, that will appear in the communications between the offering entity and end users, where such is in addition to, or in place of, information/messages/text, links, and the like. Methods and/or systems of the present invention allows for any means, whether ordinary or highly creative, of communication between an offering entity and end user. For example, an offering entity could provide communications in print form to end users, such as where the above fifteen year-old girl/promoter can upload a photograph of herself wearing particular cosmetics, whereby the photograph will appear in the printed communications from the cosmetics company/offering entity that are received by the end users/friends that the girl/promoter has helped procure.

With regards to communications to end users in the form of a video clip or movie clip to end users, an offering entity might enable a promoter to upload to the file comprising the "advertisements" any desired picture, photograph, image, video, film, etc., which thereby becomes integrated in the video or movie clip that is presented to the end user, such as where an individual/promoter uploads an image of his pet that is incorporated into video communications that a pet food company/offering entity communicates to those particular end users said individual/promoter has helped procure.

With regards to communications to end users in the form of an audio clip or sound clip in addition to, or in place of, textual or visual elements, an offering entity might enable the above individual/promoter pet owner to upload an audio clip to the file comprising the advertisements that the pet food company could incorporate with online advertising to the particular end users the individual/promoter has helped procure. Here, if a friend of the pet owner/promoter clicks on the pet food company online advertising on the pet owner's social network page, the friend might be greeted with an audio clip/sound clip of the pet owner's Basset hounds howling at the moon.

A message from a "promoter" that an end user knows, or has become acquainted with, could help make whatever communications less likely to be discarded without being read, viewed, and/or heard, whereby an end user is much more likely to read a catalog, newsletter, link, or watch a video if a promoter that is a known contact has provided input in the form of a message, advertisement, image, video, audio file, sound file, etc. While "warm" contacts are deemed especially valuable, a promoter may nonetheless promote to any persons and/or entities comprising any level of relationship, familiarity or acquaintance, or absence thereof.

In considering a plurality of promoters, it is possible for an end user to see mentions and/or advertisements for a plurality of promotional entities in the online advertisements or other communications from the offering entity, even if only one, or some, of the mentioned/advertised promotional entities acted in a direct promotional capacity to generate the particular end user for the offering entity. For example, after an end user clicks on an advertisement for offering entity "A" that appears on video site "A", the end user could very well see graphic images and/or mentions and/or advertisements in the online advertisement or other communications of offering entity "A" for not only video site "A", but for search engine "A", search engine "B", social network "A", and micro-blogger "A" as well, whereby these other entities additional to video site "A"

also serve in as a promoter for offering entity "A". Furthermore, such a relationship can work for the benefit of the offering entity's own desire for self-promotion, where the advertising/communications showing the promoters might also include promotional text, e.g., "Check us out on video site "A"; Look for us on search engine "A"; Search for us on search engine "B"; Become a member of us on social network "A"; or "Look for the latest messages from us on microblogger "A", respectively, where the "us" is the offering entity.

Furthermore, while it is intended for a mentions and/or advertisements of at least one given promoter to be included in the communications from the offering entity to those end users generated by the promoter/promoters, the present invention does not limit these mentions and/or advertisements to only those end users generated by the promoter, whereby these mentions and/or advertisements may also go to other end users as well that are not directly generated by the promoter, per the discretion of the offering entity and/or the promoter.

Ultimately, the method is applicable regardless of how or where the promoter and/or the offering entity is accessed, wherein such access comprises the Internet, a communicative conduit, a communicative device, an online advertisement, a website, a search engine, a network, a social network, an outlet, a provider, a call center, a mailing, a physical location, and the like. While access with regards to these realms has become more and more situated online, the use of communicative devices such as telephones, the use of mail deliveries, and walking into a physical location are still deemed to be relevant.

As such, the method is intended to incentivize promoters as a means of full or partial compensation to promote an offering entity's product, service, brand, relationship, or information.

Considering the many variations with regards to applications, it is possible for the disclosure to be practiced in myriad ways. It is anticipated by the Applicant that the full potential, spirit and scope of the disclosure, as well as its equivalents, will be apparent to those skilled in the art.

The invention claimed is:

1. A method using at least one computer server wherein an individual receives at least one message as a means of full or partial compensation for promoting an advertiser of products or services to contacts of said individual, wherein said message is provided to said contacts, said method comprising:
    (a) electronically providing a file, using a computer server, comprising said message of said individual;
    (b) electronically storing said file, using a computer server, on a computer readable medium;
    (c) electronically cross referencing, using a computer server, said file comprising said message of said individual to communications of said advertiser;
    (d) distributing advertising of said advertiser that is cross referenced to said individual;
    (e) electronically establishing accounts, using a computer server, for said contacts based on said advertising; and
    (f) electronically issuing said communications, using a computer server, to said contacts of said individual, wherein said communications of said advertiser includes said message of said individual as a means of full or partial compensation to said individual;
wherein said individual is different than said advertiser; wherein said contacts comprise friends, family, and acquaintances of said individual; wherein the content of said message is provided by said individual or by said advertiser in relation to said individual; and wherein said advertising or said communications of said advertiser is used to promote a product, service, brand, relationship, or information.

2. The method of claim 1, wherein said advertising appears on a social network page of said individual that is seen by said contacts.

3. The method of claim 1, wherein said advertising appears on social network pages of said contacts.

4. The method of claim 1, wherein said advertising is sent or forwarded to said contacts.

5. The method of claim 4, wherein said advertising is sent or forwarded to said contacts by said individual, or on behalf of said individual.

6. The method of claim 1, wherein said advertising or said communications of said advertiser is experienced by said contacts or said individual, or is distributed to said contacts or said individual, using at least one selected from a social network, a website, a search engine, an email account page, an email inbox, an emailed link, a network, a communicative conduit, a communicative device, a provider, a content provider, a blog provider, the Internet, an online advertisement, a print advertisement, a mailing, an audio advertisement, an outlet, a call center, or a physical location.

7. The method of claim 1, wherein said advertising or said communications of said advertiser comprises at least one selected from advertisements, coupons, special offers, catalogs, brochures, promotional literature, special programs, newsletters, information dissemination, announcements, notices, or reminders, further comprising wherein said communications comprises a billing statement.

8. The method of claim 1, wherein said individual can provide an individualized message to a particular contact selected from a plurality of said contacts.

9. The method of claim 1, wherein said message of said individual is added, modified, or deleted by said individual, on behalf of said individual, or by said advertiser.

10. The method of claim 1, wherein said advertising or said communications of said advertiser are experienced when said advertising or said communications are clicked on, triggered, or deployed by said contacts, or by said individual.

11. The method of claim 1, wherein said advertising or said communications of said advertiser comprises a notification that said contacts will experience said message of said individual when said advertising or said communications of said advertiser are clicked on, triggered or deployed by said contacts, or by said individual.

12. The method of claim 1, wherein said individual is prompted for permission, information, input, preferences, or endorsements regarding the products or services of said advertiser, wherein said permission, said information, said input, said preferences, or said endorsements can be used for content in said message of said individual, or for content in said advertising or said communications of said advertiser.

13. The method of claim 1, wherein said contacts of said individual are encouraged to experience said message of said individual.

14. The method of claim 1, wherein said advertising or said communications of said advertiser comprises at least one selected from advertising, said message of said individual, a message, text, information, a picture, a photograph, a graphic image, a video clip, a movie clip, an audio clip, or a sound clip.

15. The method of claim 1, wherein said message of said individual comprises at least one selected from a message, text, information, advertising, a picture, a photograph, a graphic image, a video clip, a movie clip, an audio clip, or a sound clip.

16. The method of claim 1, wherein access to said individual, or to said advertiser, comprises at least one selected from a social network, a website, an online advertisement, a search engine, the Internet, a network, a communicative conduit, a communicative device, a provider, an outlet, a call center, an email, a mailing, or a physical location.

17. The method of claim 1, wherein establishing said accounts occurs when said advertising is clicked on, triggered, or deployed by said contacts online, wherein clicking on, triggering, or deploying said advertising online comprises a de facto account application process or a de facto account sign-up process comprising said contacts experiencing at least one selected from said advertising of said advertiser, said communications of said advertiser, information or content provided by said advertiser, or said message of said individual.

18. The method of claim 1, wherein a de facto account application process or a de facto account sign-up process comprised of said contacts clicking on, triggering, or deploying said advertising online comprises a link to, or a visit to, an online location or website belonging to or associated with said advertiser.

* * * * *